(12) United States Patent
Lueng et al.

(10) Patent No.: US 8,984,738 B2
(45) Date of Patent: Mar. 24, 2015

(54) MANUFACTURING METHOD OF A SLIDER AND MANUFACTURING APPARATUS THEREOF

(75) Inventors: Chiuming Lueng, Hong Kong (CN); Mankit Lee, Hong Kong (CN); Lorest Garcia Pingul, Hong Kong (CN); Yasutoshi Fujita, Hong Kong (CN); Cheukman Lui, Hong Kong (CN); ChiYuen Mok, Hong Kong (CN); Cheukwing Leung, Hong Kong (CN); Juren Ding, Hong Kong (CN); Rongkwang Ni, Hong Kong (CN)

(73) Assignee: SAE Magnetics (H.K.) Ltd, Hong Kong (CN)

( * ) Notice: Subject to any disclaimer, the term of this patent is extended or adjusted under 35 U.S.C. 154(b) by 244 days.

(21) Appl. No.: 13/402,061

(22) Filed: Feb. 22, 2012

(65) Prior Publication Data
US 2013/0212871 A1  Aug. 22, 2013

(51) Int. Cl.
*G11B 5/127*  (2006.01)
*H04R 31/00*  (2006.01)

(52) U.S. Cl.
USPC ................ 29/603.03; 29/603.08; 29/603.12

(58) Field of Classification Search
CPC .. G11B 25/043; G11B 5/3163; G11B 5/3173; G11B 5/3169; G11B 5/102; B24B 19/00; B24B 37/00
USPC ............. 29/603.03, 603.08, 603.12, 603.15, 29/603.16
See application file for complete search history.

(56) References Cited

U.S. PATENT DOCUMENTS

| | | | | |
|---|---|---|---|---|
| 5,722,156 A | * | 3/1998 | Balfrey et al. | 29/603.08 |
| 6,081,991 A | * | 7/2000 | Tsunoda et al. | 29/603.08 |
| 6,557,242 B1 | * | 5/2003 | Santini | 29/603.14 |
| 6,687,976 B1 | * | 2/2004 | Koyama et al. | 29/603.12 |
| 6,694,604 B2 | * | 2/2004 | Santini | 29/603.14 |
| 2013/0212871 A1 | * | 8/2013 | Lueng et al. | 29/603.08 |

* cited by examiner

*Primary Examiner* — David Angwin
(74) *Attorney, Agent, or Firm* — Nixon & Vanderhye PC

(57) ABSTRACT

A manufacturing method of a slider includes steps of (a) providing a row bar with a plurality of slider elements connecting together, the row bar having an air bearing surface, a back surface opposite the air bearing surface, a bonding surface and a bottom surface opposite the bonding surface; (b) grinding the bottom surface of the row bar; (c) lapping the air bearing surface of the row bar so as to obtain a predetermined requirement, and applying a first magnetic field with a first direction during lapping the air bearing surface, and the first direction being parallel to the air bearing surface and the bonding surface; and (d) cutting the row bar into a plurality of individual sliders. The present invention can maintain a good performance of a magnetic head during the manufacturing process.

5 Claims, 5 Drawing Sheets

10

20

210

MANUFACTURING METHOD OF A SLIDER AND MANUFACTURING APPARATUS THEREOF

FIELD OF THE INVENTION

The present invention relates to information recording disk drive devices and, more particularly to a manufacturing method of a slider in the disk drive device and a manufacturing apparatus thereof.

BACKGROUND OF THE INVENTION

Hard disk drive incorporating rotating magnetic disks is commonly used for storing data in the magnetic media formed on the disk surfaces. Typically, magnetic heads embedded into sliders used in the hard disk drive are those having a structure in which a reproducing (read) head having a magnetoresistive element (that may be hereinafter called an MR element) for reading and a recording (write) head having an induction-type electromagnetic transducer for writing are stacked on a substrate.

For read heads, giant magnetoresistive (GMR) elements utilizing a giant magnetoresistive effect have been practically used as MR elements. Conventional GMR elements have a current-in-plane (CIP) structure in which a current used for detecting magnetic signals (that is hereinafter called a sense current) is fed in the direction parallel to the plane of each layer making up the GMR element. Another type of GMR elements have a current-perpendicular-to-plane (CPP) structure in which the sense current is fed in a direction intersecting the plane of each layer making up the GMR element, such as the direction perpendicular to the plane of each layer making up the GMR element. Another type of MR element is tunnel magnetoresistive (TMR) element, which also has a CPP structure and has become the mainstream MR element due to its more remarkable change of MR ratio by replacing GMR element.

FIG. 1 shows a detailed structure of a conventional CPP-TMR element read head, as shown, the read head 10 includes a first shielding layer 111 formed on a substrate 110, a second shielding layer 114, and a TMR element 112 sandwiched between the first and second shielding layers 111, 114, and a pair of hard magnets 113 formed on two sides of the TMR element 112. Concretely, the read head 10 may include anti-ferromagnetic (AFM) materials (not shown) within or near the TMR element 112.

As known, the read head including AFM materials, and/or hard magnets 113, and/or shielding layers 111, 114 can be affected by temperature. For example, for the AFM materials, which have no magnetism due to their inner magnetic moment directions counteracting each other, however under a high temperature, the inner structure and the material characteristic of the AFM material may change and become unstable, the magnetic moment directions may change and be disordered for example.

According to the conventional manufacturing method of sliders with the above-mentioned magnetic heads, typically, a wafer provided with many magnetic head elements is first cut to separate into a plurality of row bars each of which has a plurality of slider elements aligned. Then, each row bar is lapped so as to adjust its element height to a defined size. One important lapping surface is that the medium facing surface for each slider element which is called an air bearing surface (ABS). Concretely, the row bar is pressed to a rotating lapping plate at a predetermined pressure to lap the ABS of the row bar to a predetermined requirement. Finally, the row bar is cut into a plurality of individual sliders.

Inevitably, a local high temperature will be generated on the lapping surface during the lapping process. As mentioned above, the read head including AFM materials, and/or hard magnets 113, and/or shielding layers 111, 114 may be affected by temperature easily. And since the magnetic moment directions of the AFM materials or other elements are aligned either parallel or perpendicular to the ABS of the row bar, therefore when the local high temperature is generated on the ABS, the magnetic moment directions of the read head will be disordered, somehow like annealing effect without align magnetic direction, which will affect the performance of the magnetic head. Finally, the function and performance of the slider and hard disk drive may be weakened.

Hence, it is desired to provide an improved manufacturing method of a slider and manufacturing apparatus thereof to overcome the above-mentioned drawbacks.

SUMMARY OF THE INVENTION

One objective of the present invention is to provide a manufacturing method of a slider, which can maintain a good performance of a magnetic head during the manufacturing process.

Another objective of the present invention is to provide a manufacturing apparatus of a slider, by which an improved slider with good performance is obtained.

To achieve the above objectives, a manufacturing method of a slider of the present invention includes steps of:

(a) providing a row bar with a plurality of slider elements connecting together, the row bar having an air bearing surface, a back surface opposite the air bearing surface, a bonding surface and a bottom surface opposite the bonding surface;

(b) grinding the bottom surface of the row bar;

(c) lapping the air bearing surface of the row bar so as to obtain a predetermined requirement, and applying a first magnetic field with a first direction during lapping the air bearing surface, and the first direction being parallel to the air bearing surface and the bonding surface; and (d) cutting the row bar into a plurality of individual sliders.

As one preferred embodiment, the manufacturing method further includes applying a second magnetic field with a second direction during the step (b), and the second direction being perpendicular to the air bearing surface and parallel to the bonding surface.

As another preferred embodiment, the manufacturing method further includes applying a third magnetic field with a third direction during the step (d), and the third direction being parallel to the air bearing surface and perpendicular to the bonding surface.

Preferably, the manufacturing method further includes lapping the back surface of the row bar and applying the first magnetic field with the first direction during lapping.

Preferably, the first magnetic field is applied by at least one permanent magnet or electromagnet.

Preferably, the first magnetic field has an intensity in the range of 50 Oe~50 KOe.

Accordingly, a manufacturing apparatus of a slider of the present invention includes a grinding machine for grinding a bottom surface of a row bar; a lapping machine for lapping an air bearing surface of the row bar respectively so as to obtain a predetermined requirement; a first magnetic field applying device for applying a first magnetic field with a first direction during lapping the air bearing surface, and the first direction being parallel to the air bearing surface and a bonding surface that is opposite the bottom surface; and a cutting machine for cutting the row bar into a plurality of individual sliders.

As one preferred embodiment, the manufacturing apparatus further includes a second magnetic field applying device for applying a second magnetic field with a second direction during grinding the bottom surface of the row bar, and the second direction being perpendicular to the air bearing surface and parallel to the bonding surface.

As another preferred embodiment, the manufacturing apparatus further includes a third magnetic field applying device for applying a third magnetic field with a third direction during cutting the row bar into a plurality of individual sliders, and the third direction being parallel to the air bearing surface and perpendicular to the bonding surface.

Preferably, the lapping machine is further adapted for lapping a back surface of the row bar which is opposite the air bearing surface, and the first magnetic field applying device is adapted for applying the first magnetic field with the first direction during lapping the back surface.

Preferably, the first magnetic field applying device includes at least one permanent magnet or electromagnet.

Preferably, the first magnetic field has a range of 50 Oe~50 KOe.

In comparison with the prior art, the present invention applies the first magnetic field with the first direction parallel to the ABS and the bonding surface during the ABS is lapped, thus, the magnetic moment directions of the part of read head (including AFM layer, and/or hard magnet, and/or free layer, and/or shielding layers) originally arranged parallel to the ABS and the bonding surface will follow the first direction under the first magnetic field, without affected by the local high temperature generated during lapping. That is, the magnetic moment directions are maintained in the initial order without disorder, which maintains the stability of the read head. Accordingly, the free layer of the TMR element in the read head will not change freely and maintain at an ideal direction, which is beneficial to improve the reading performance of the slider.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
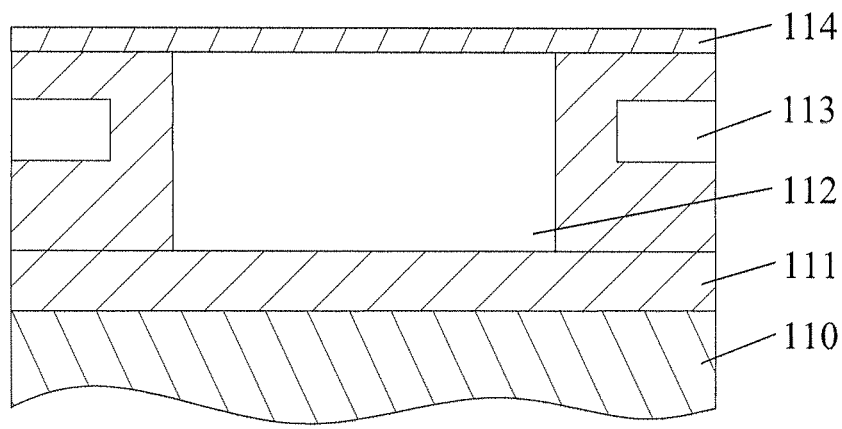
FIG. 1 is an ABS view of a conventional CPP-TMR element read head.

Various preferred embodiments of the invention will now be described with reference to the figures, wherein like reference numerals designate similar parts throughout the various views. As indicated above, the invention is directed to a manufacturing method of a slider, which can prevent the magnetic head in the slider from being affected by the local high temperature generated during the lapping the ABS, thereby maintaining a good performance of the magnetic head.

The conventional magnetic head for a slider typically includes a read portion for reading data from the disk, and a write portion for writing data into the disk. The read portion is generally formed by a MR read head, specifically, the present description only concentrates on the CPP-TMR read head. Obviously, the persons ordinarily skilled in the art can understand the application of the present invention on the other read heads after reading the following description.

Figure 2:
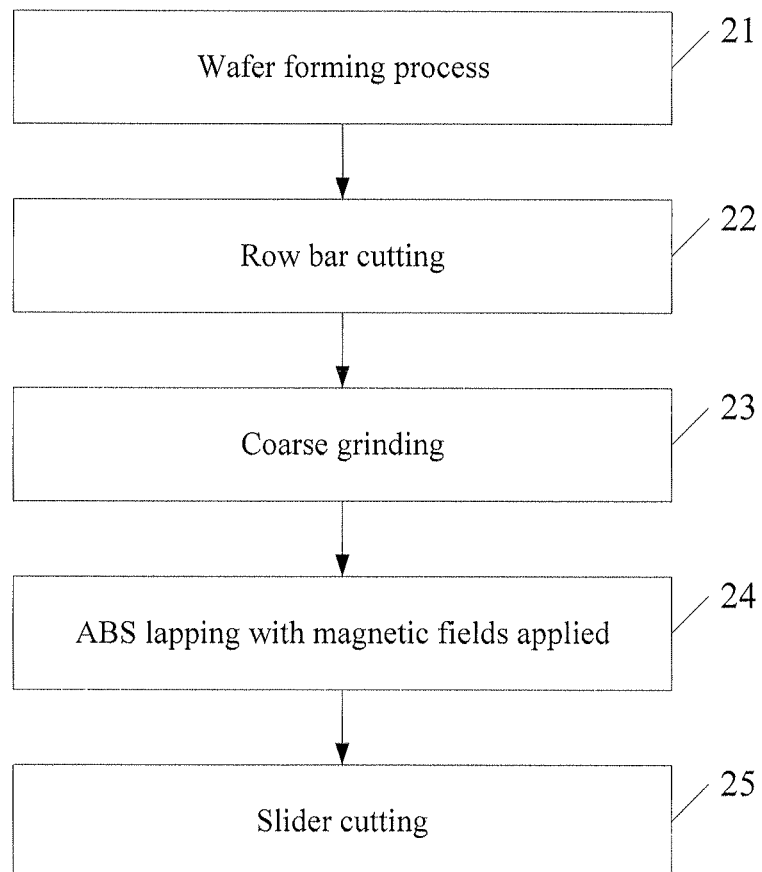
FIG. 2 schematically illustrates a manufacturing process of a slider according to one embodiment of the present invention.
Figure 3:
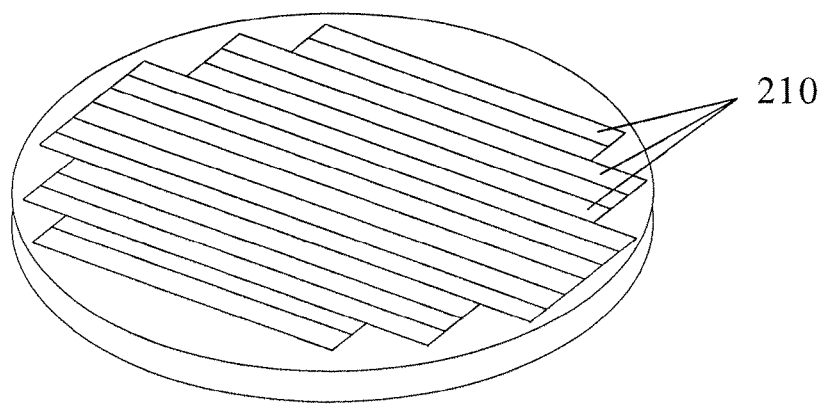
FIG. 3 illustrates a wafer provided in the manufacturing process shown in FIG. 2.
Figure 4:
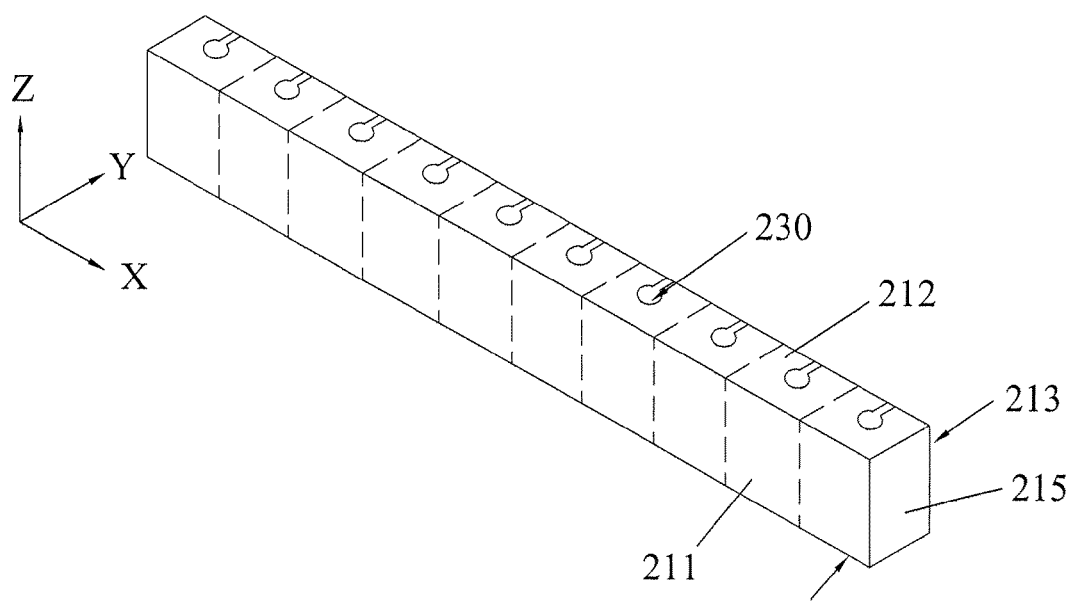
FIG. 4 illustrate a row bar cut down from the wafer shown in FIG. 3.

FIG. 2 schematically illustrates a manufacturing process of a slider according to one embodiment of the present invention, and FIG. 3 and FIG. 4 illustrate a wafer and a row bar made in the manufacturing process shown in FIG. 2, respectively. Hereinafter, the whole manufacturing process of the slider according to the present invention will be schematically described with reference to these figures.

At first, a wafer process is performed (step 21). In this wafer process, many slider elements with magnetic heads are formed by a thin-film technology on a wafer 20 made of a ceramic material. Each magnetic head is provided with a CPP-TMR read head and an inductive write head.

Then, a machining process is performed (step 22). In this process, first, the wafer 20 is cut into a plurality of blocks, and then each block is further cut to obtain a plurality of row bars 210. On each row bar 210, a plurality of slider elements 220 are aligned and arranged. As shown in FIG. 4, the row bar 210 has an ABS 211, a back surface 213 opposite the ABS 211, a bonding surface 212, a bottom surface 214 opposite the bonding surface 212, and two side surfaces 215. Each slider element 220 is provided with a magnetic head 230 embedded therein.

Then, a necessary and important machining step is performed which is lapping process (steps 23 and 24, at least). For increasing the lapping effect, a coarse grinding will be performed before the fine lapping, concretely, the bottom surface 214 of the row bar 210 is grinded to a predetermined size (step 23). Then, the ABS 211 of the row bar 210 is lapped to control characteristics of the magnetic head 230, for example magnetoresistive height (MR height) of the TMR element. This lapping process is performed using a conventional lapping machine, which is well known to one person ordinarily skilled in the art and omitted here therefore. As an improvement of the present invention, a first magnetic field with a first direction is provided to the row bar 210 during lapping the ABS 211. Concretely, the first direction is parallel to the ABS 211 and the bonding surface 212, which is denoted by X (referring to FIG. 4).

As a preferable embodiment, during the grinding of the bottom surface 214 of the row bar 210, a second magnetic field with a second direction is applied, and the second direction is perpendicular to the ABS 211 and parallel to the bonding surface 212, which is denoted by Y.

Alternatively, the back surface 213 of the row bar 210 is lapped so as to achieve a predetermined size before or after the ABS 211 is lapped. As a preferable option, during this lapping process, the first magnetic field with the first direction X is applied to the row bar 210.

After the lapping process for the lapped surfaces, this row bar 210 is cut to separate into a plurality of individual sliders 220 (step 25). Preferably, during the cutting process, a third magnetic field with a third direction is applied to the row bar 210, and the third direction is parallel to the ABS 211 and perpendicular to the bonding surface 212, which is denoted by Z (referring to FIG. 4).

Figure 5A:
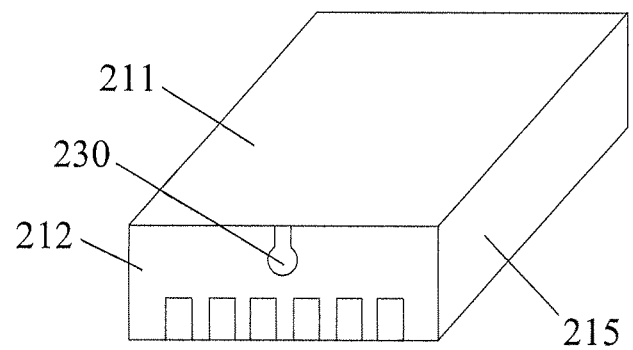
FIG. 5a shows an individual slider finally made by the manufacturing method according to the present invention.

FIG. 5a show an individual slider 220 with a magnetic head 230 finally made by the manufacturing method mentioned above, and FIG. 5b is a partial cross-section view of the magnetic head 230 of the slider 220, which illustrates the structure of a read head 300 of the magnetic head 230.

Figure 5B:
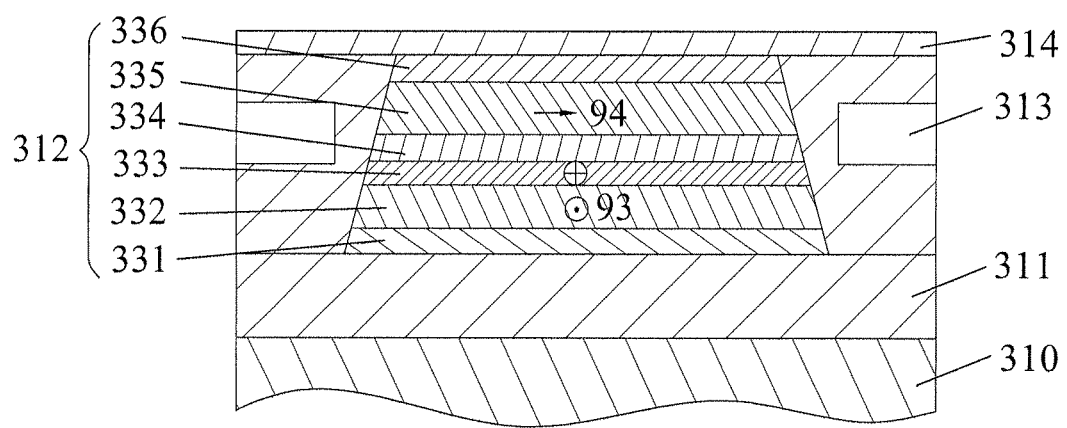
FIG. 5b is a partial cross-section view of the magnetic head of the slider shown in FIG. 5a, which illustrates the structure of a read head of the magnetic head.

As shown in FIG. 5b, the read head 300 includes a first shielding layer 311 formed on a substrate 310, a second shielding layer 314, and a TMR element 312 sandwiched between the first and second shielding layers 311, 314, and a pair of hard magnets 313 formed on two sides of the TMR element 312.

As mentioned on the background, when lapping the ABS 211, a local high temperature will be generated on the ABS 211 which will disorder the magnetic moment directions of the part of the read head 300 (AFM materials, and/or hard magnets 313, and/or free layer, and/or shielding layers 311, 314) because the magnetic moment directions are arranged and parallel to the ABS 211 and the bonding surface 212, for example. Combining with FIG. 2 and as described above, since the first magnetic field with the first direction X parallel to the ABS 211 and the bonding surface 212 is provided to the row bar 210 during lapping the ABS 211, thus the magnetic moment directions of the part of the read head 300 (including AFM layer, and/or hard magnet 313, and/or free layer, and/or shielding layers 311, 314) will follow the first direction X under the first magnetic field. That is, the magnetic moment directions are maintained in the initial order without disorder. At the same time, the free layer of the TMR element 312 will not change freely and maintain at an ideal direction, which is beneficial to improve the reading performance of the slider 220.

Similarly, since the first magnetic field with the first direction X is applied to the row bar 210 during the back surface 213 parallel to the ABS 211 of the row bar 210 is lapped (step 24 in FIG. 2), thus the magnetic moment directions arranged parallel to the ABS 211 and the back surface 213 will not be disordered due to the local high temperature generated on the back surface 213.

Concretely, referring to FIG. 5b again, the TMR element 312 is multiple-layer structure which includes a pinning layer 331, a first AFM layer 332, a pinned layer 333, a tunnel barrier layer 334, a free layer 335, and a cap layer 336 stacked together in turn. The pinning layer 331 is formed on the first shielding layer 311, and the first AFM layer 332 formed on the pinning layer 331 is made of AFM material, such as NiO or IrMn. The first AFM layer 332 has a series of magnetic moment directions 93 perpendicular to the ABS 211 and parallel to the bonding surface 212 of the slider 220. The free layer 335 contains a ferromagnetic substance and has a direction of magnetization 94 that changes in responds to an external magnetic field. The magnetization direction or the magnetic moment 94 of the free layer 335 orients generally parallel to the ABS 211 in the absence of an applied external magnetic field.

Combining with FIG. 5b and FIG. 3, since the second magnetic field with the second direction Y perpendicular to the ABS 211 and parallel to the bonding surface 212 is applied to the row bar 210 during the grinding process (step 23 in FIG. 2), thus, the magnetic moment directions 93 of the first AFM layer 332 will follow the second direction Y under the second magnetic field. That is, the magnetic moment directions 93 are maintained in the initial order without disorder during grinding, which is beneficial to maintain the stability of the TMR element 312.

Alternatively, a second AFM layer (not shown) may be configured in the side surface 215 of the slider 220 and near the TMR element 312 so as to achieve a certain function (stabilizing the TMR element 312 for example), which has magnetic moment directions which are perpendicular to the bonding surface 212 and parallel to the ABS 211. Regarding to this type of slider, when cutting the row bar 210 along the side surface 215, a local high temperature also will be generated on the side surface 215 which will affect the magnetic moment directions of the second AFM layer arranged perpendicular to the bonding surface 212 and parallel to the ABS 211. Therefore, because the third magnetic field with the third direction Z is applied to the row bar 210 during the cutting process (step 25 in FIG. 2), thus the magnetic moment directions of the second AFM layer will follow the third direction Z under the third magnetic field. That is, the magnetic moment directions of the second AFM layer are maintained in the initial order without disorder, which is beneficial to maintain the stability of the TMR element as well.

Alternatively, the intensity of the first, second and third magnetic fields is in the range of 50 Oe~50 KOe, which is adjustable according to the different sliders. Preferably, in the present embodiment, the intensity of the first magnetic field is about 1 KOe.

Figure 5C:
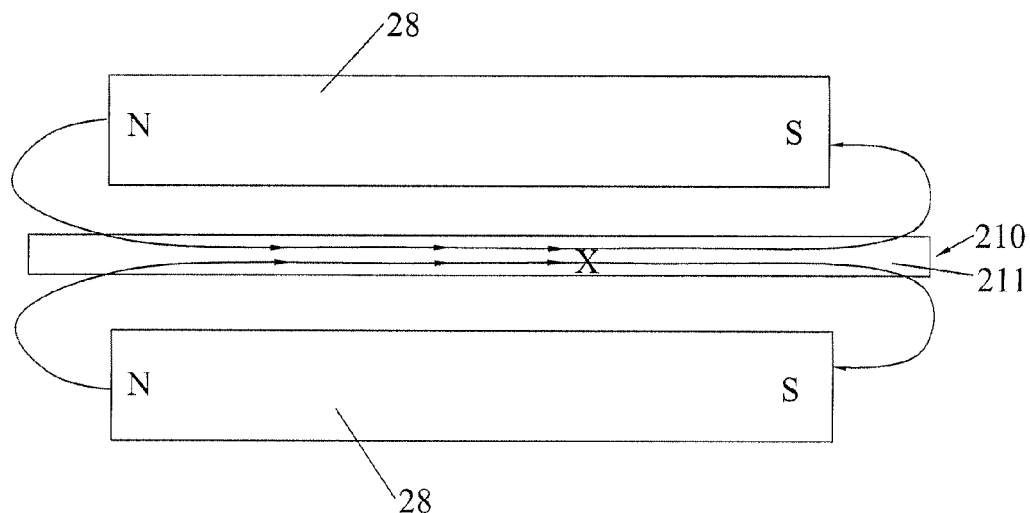
FIG. 5c schematically illustrates how the first magnetic field is applied to the row bar.

In the present invention, the first, second and third magnetic fields are applied by at least one permanent magnet or electromagnet which is formed closely to the row bars 210. For example, as shown in FIG. 5c, it shows two permanent magnets 28 are formed on two sides of one of row bars 210 which provide the first magnetic field with the first direction X to the row bar 210 during lapping the ABS 211. Similarly, the amount of the permanent magnets can be four and which can be replaced by electromagnets as well.

Figure 6:
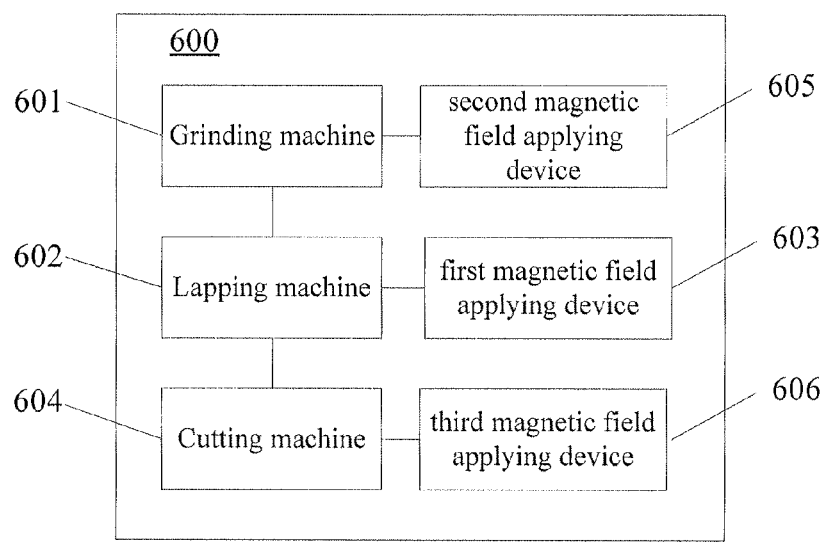
FIG. 6 is a schematic view of a manufacturing apparatus according to one embodiment of the present invention.

Accordingly, FIG. 6 shows a manufacturing apparatus used during the manufacturing method described above. The manufacturing apparatus 600 of a slider according to one embodiment of the present invention includes a grinding machine 601, a lapping machine 602, a first magnetic field applying device 603 and a cutting machine 604. Concretely, the grinding machine 601 is adapted for coarsely grinding the bottom surface 214 of the row bar 210 to a predetermined size. The lapping machine 602 is adapted for lapping the ABS 211 of the row bar 210 to control characteristics of the magnetic head 230, and lapping the back surface 213 of the row bar 210 optionally. The first magnetic field applying device 603 is adapted for applying a first magnetic field with a first direction to the row bar 210 during lapping the ABS 211, and the first direction is parallel to the ABS 211 and the bonding surface 212. And the cutting machine 604 is adapted for cutting the row bar 210 into a plurality of individual slider 220.

As a preferable embodiment, the manufacturing apparatus 600 further includes a second magnetic field applying device 605 for applying a second magnetic field with a second direction which is perpendicular to the ABS 211 and parallel to the bonding surface 212, during grinding of the bottom surface 214 of the row bar 210. And during the lapping of the back surface 213 of the row bar 210, the first magnetic field applying device 603 is adapted for applying a first magnetic field with the first direction to the row bar 210.

More preferably, the manufacturing apparatus 600 further includes a third magnetic field applying device 606 for applying a third magnetic field with a third direction to the row bar 210 during the cutting process, and the third direction is parallel to the ABS 211 and perpendicular to the bonding surface 212.

As explained above and combining with FIG. 6 and FIG. 2, since the first magnetic field with the first direction and the second magnetic field with the second direction are applied to the row bar 210 during the lapping surfaces respectively, thus the magnetic moment directions of the part of read head 300 (AFM material, and/or hard magnet 313, and/or free layer, and/or shielding layers 311, 314) will follow the first direction under the first magnetic field, and the magnetic moment directions 93 of the first AFM layer 334 will follow the second direction under the second magnetic field. Namely, the magnetic moment directions are maintained in the initial order without disorder under a local high temperature generated during the lapping. At the same time, the free layer of the TMR element 312 will not change freely and maintain at an ideal direction, which is beneficial to improve the reading performance of the slider 220.

On the other hand, since the third magnetic field with the third direction is applied to row bar 210 during the cutting process, thus the magnetic moment directions of the second AFM layer (not shown) configured in the side surface 215 of the slider 220 will follow the third direction under the third magnetic field and maintained in the initial order without disorder, which is beneficial to maintain the stability of the TMR element 312 as well.

In the present embodiment, the first, second and third magnetic field applying devices 603, 605, 606 includes at least one permanent magnet or electromagnet.

Alternatively, the intensity of the first, second and third magnetic fields is in the range of 50 Oe~50 KOe, which is adjustable according to the different sliders.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A manufacturing method of a slider for an information recording disk drive, comprising the following steps, in the order presented:
    (a) providing a row bar including a plurality of slider elements, the row bar having an air bearing surface, a back surface opposite the air bearing surface, a bonding surface and a bottom surface opposite the bonding surface;
    (b) grinding the bottom surface of the row bar;
    (c) lapping the air bearing surface of the row bar so as to obtain a predetermined requirement of the air bearing surface, and applying a first magnetic field with a first direction during the lapping of the air bearing surface, the first direction being parallel to the air bearing surface and the bonding surface, wherein the first magnetic field has an intensity in the range of 50 Oe~50 KOe; and
    (d) cutting the row bar into a plurality of individual sliders.

2. The manufacturing method according to claim 1, further comprising applying a second magnetic field with a second direction during (b), the second direction being perpendicular to the air bearing surface and parallel to the bonding surface.

3. The manufacturing method according to claim 1, further comprising applying a third magnetic field with a third direction during (d), the third direction being parallel to the air bearing surface and perpendicular to the bonding surface.

4. The manufacturing method according to claim 1, further comprising lapping the back surface of the row bar and applying the first magnetic field with the first direction during the lapping.

5. The manufacturing method according to claim 1, wherein the first magnetic field is applied by at least one permanent magnet or electromagnet.

* * * * *